United States Patent [19]
Chiappa

[11] Patent Number: 5,934,581
[45] Date of Patent: Aug. 10, 1999

[54] MILL FOR THE FINE GRINDING OF SOLID PARTICLES IN GENERAL AND, PARTICULARLY, OF SOLID PARTICLES DISPERSED IN A CONTINUOUS LIPID PHASE

[75] Inventor: Ottorino Chiappa, Monza, Italy

[73] Assignee: Food Technologies S.r.l., Busto Arsizio VA, Italy

[21] Appl. No.: 08/675,890

[22] Filed: Jul. 5, 1996

[30] Foreign Application Priority Data

Jul. 7, 1995 [EP] European Pat. Off. .............. 95830291

[51] Int. Cl.⁶ .................................................. B02C 17/16
[52] U.S. Cl. ......................... 241/170; 241/171; 241/172; 241/260.1
[58] Field of Search .................................. 241/170, 171, 241/172, 179, 260.1, 65

[56] References Cited

U.S. PATENT DOCUMENTS

| | | | |
|---|---|---|---|
| 4,174,074 | 11/1979 | Geiger | 241/46.11 |
| 4,242,002 | 12/1980 | Kawabata | 241/172 X |
| 4,850,541 | 7/1989 | Hagy | 241/171 |
| 5,158,240 | 10/1992 | Ihara et al. | 241/172 |
| 5,346,146 | 9/1994 | Nitta | 241/172 |

FOREIGN PATENT DOCUMENTS

| | | |
|---|---|---|
| A-0157454 | 10/1985 | European Pat. Off. . |
| A-0-278041 | 8/1988 | European Pat. Off. . |
| A 2443799 | 4/1976 | Germany . |
| WO-A-8901825 | 3/1989 | WIPO . |

*Primary Examiner*—John M. Husar
*Attorney, Agent, or Firm*—Ostrolenk, Faber, Gerb & Soffen, LLP

[57] ABSTRACT

A mill for the fine grinding of solid particles in general comprises a casing defining an internal grinding chamber through which extends a motor-driven, rotatable shaft having outer surface which is helical along a longitudinal portion thereof and having stirrer means for stirring grinding bodies in the grinding chamber, the grinding bodies being given a component of movement along the axis of the shaft which, being superimposed on the mixing movement generated by the stirrer means, causes their circulation within the grinding chamber so as to make the temperature therein uniform and the ground product more homogeneous.

17 Claims, 2 Drawing Sheets

5,934,581

MILL FOR THE FINE GRINDING OF SOLID PARTICLES IN GENERAL AND, PARTICULARLY, OF SOLID PARTICLES DISPERSED IN A CONTINUOUS LIPID PHASE

FIELD OF THE INVENTION

The present invention relates to a mill for the fine-grinding, or refining, of solid particles in general and particularly of solid particles dispersed in a continuous lipid phase, comprising a casing defining an internal grinding chamber having at least one inlet/outlet aperture for the particles, grinding bodies housed in the grinding chamber, a motor-driven rotatable shaft extending through the grinding chamber and means for stirring the grinding bodies fixed for rotation with the motor-driven rotatable shaft.

BACKGROUND OF THE INVENTION

It is known that mills of the type specified are widely used today to achieve the medium- or fine-grinding of solid particles. In these the reduction in the dimensions is achieved by the mechanical action which the grinding bodies exert on the solid particles due to relative sliding and collisions as a result of the continuous mixing to which they are subject in the grinding chamber while the shaft is rotating. Such mills, although advantageous from various points of view, have the disadvantage that the friction between the grinding bodies generates a high degree of heat such that, during the grinding, the temperature in the grinding chamber rises considerably. Consequently the use of these mills is not very suitable for grinding heat-labile or heat-sensitive products since these may undergo undesirable changes in their characteristics if subjected to heating. For example, in pharmaceutical preparations the grinding of the active principles should be carried out at a controlled temperature to avoid changes in their structures, just as, in the production of foodstuffs, the grinding of solid particles such as sugar in mixtures including a fat phase must be carried out without excessive heating of the mixtures to avoid changes in the organoleptic characteristics of the mixtures.

From the above it is clear that there is a particular need to control the temperature reached by the solid particles during grinding to a good approximation.

In order to satisfy this requirement, grinding mills are currently used which include an outer jacket through which cooling water is circulated at a controlled temperature, this being entrusted with the task of removing at least some of the heat generated by friction within the grinding chamber. This solution does however have the disadvantage that a temperature gradient is established within the grinding chamber, the temperature increasing towards the interior so that the temperature of the product to be ground is controllable only within a wide margin of approximation. It should be stressed in this respect that the problem is particularly felt in mills with large cross-sections such as are normally used, for example, in the food and chemical industries.

The problem at the root of the present invention is that of devising a mill for the grinding of solid particles in general which has structural and functional characteristics such as to satisfy the said requirement and overcome the aforesaid problems.

SUMMARY OF THE INVENTION

This problem is solved by a mill for grinding solid particles in general and, in particular, solid particles dispersed in a continuous lipid phase, comprising: a casing defining an internal grinding chamber having at least one inlet/outlet aperture for the particles, grinding bodies in the grinding chamber, a motor-driven rotatable shaft extending through the grinding chamber, and stirrer means for stirring the grinding bodies fixed for rotation with the motor-driven, rotatable shaft, the motor-driven rotatable shaft having, at least along a longitudinal portion thereof, a substantially helical outer surface for transmitting to the grinding bodies a component of movement parallel to the longitudinal axis of the motor-driven, rotatable shaft.

The idea on which the solution of the present invention is based is mainly that of imposing on the grinding bodies a component of movement along the axis of the motor-driven, rotatable shaft which, being superimposed on the mixing motion generated by the stirrer means, causes their circulation within the grinding chamber so as to make the temperature within it more uniform and particularly achieve greater homogeneity in the ground product without harming this from the qualitative and organoleptic points of view.

BRIEF DESCRIPTION OF THE DRAWINGS

Further characteristics and advantages of the mill of the present invention will become apparent form the description of a preferred embodiment given below purely by way of non-limitative example, with reference to the appended drawings, in which.

DETAILED DESCRIPTION OF THE PREFERRED EMBODIMENT

Figure 1:
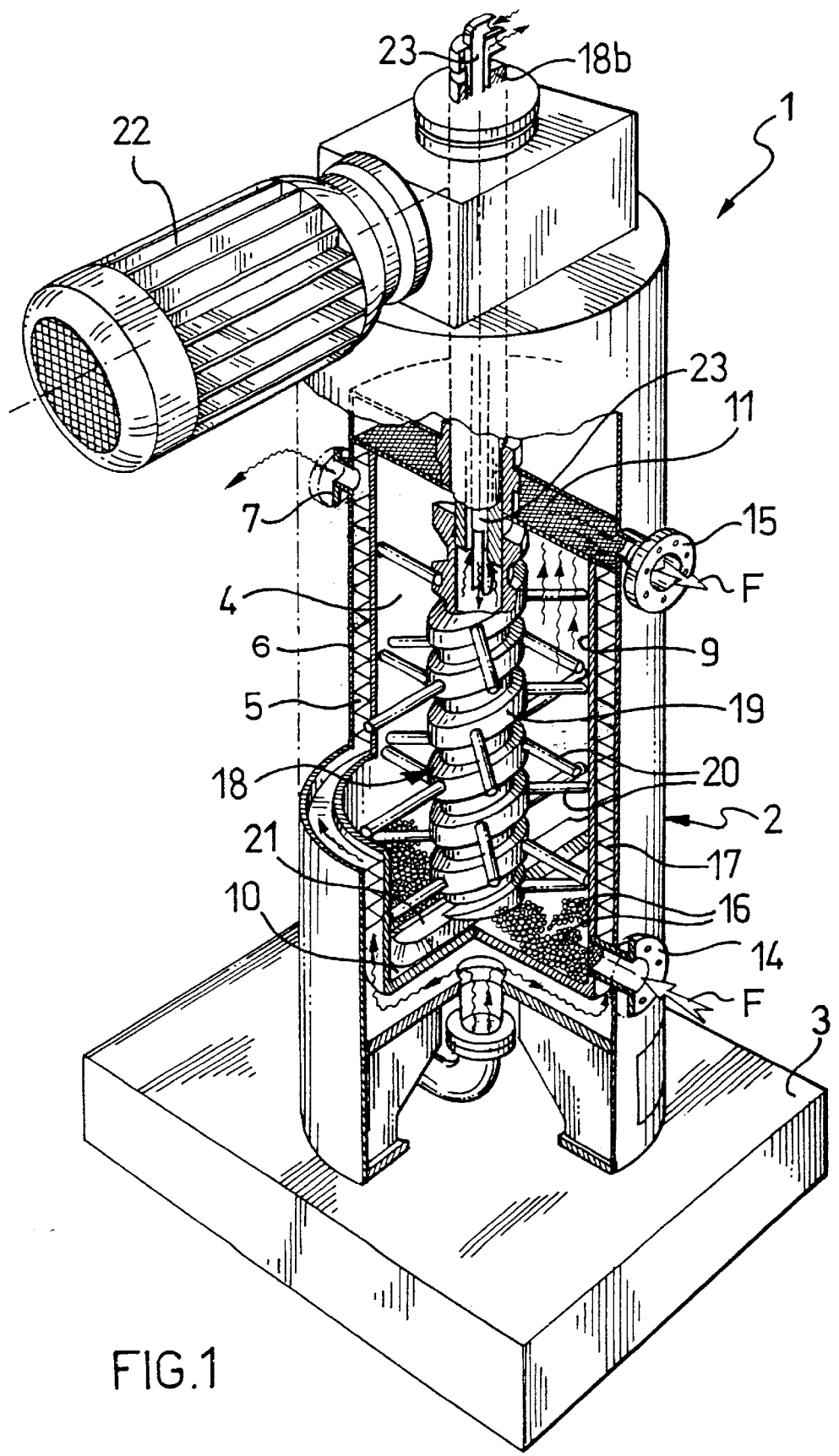
FIG. 1 is a partially-sectioned perspective view of a mill according to the present invention.

With reference to the appended drawings, a mill according to the present invention for grinding a mixture of solid sugar and cocoa particles dispersed in a lipid phase constituted by cocoa butter is generally indicated 1.

The mill 1 comprises a cylindrical casing 2 extending vertically along an axis X—X from a support and anchoring platform 3.

The casing 2 comprises an internal grinding chamber 4 made from an abrasion-resistant alloy and an outer jacket 6 of stainless steel defining an interspace 5 with the grinding chamber 4. The jacket 6 has flanged sleeves 7 and 8 adjacent upper and lower parts respectively of the grinding chamber 4 which put the interspace 5 is fluid communication with a conventional controlled-temperature water circuit not shown in the drawings.

Preferably the interspace 5 contains a helix 17 with two starts welded to the outside of the grinding chamber 4 by a continuous weld so as to create an obligatory pathway in the interspace 5 through which the water may flow.

The grinding chamber 4 has a cylindrical peripheral 9, a flat base 10 connected to the peripheral wall, and an upper grid 11. It also has an inlet aperture 12 and an outlet aperture 13 for the mixture adjacent the base 10 and the upper face of the grid 11 respectively. Flanged sleeves 14 and 15 project from the casing 2 of the mill 1 and put the inlet aperture 12 and the outlet aperture 13 in the fluid communication with a supply duct and an outlet duct respectively of the mill 1, not shown in the drawings.

Grinding bodies 16 preferably constituted by special steel balls with a high resistance to abrasion, with a diameter between 8.6 millimeters and 9.6 millimeters fill the grinding chamber 4 to a predetermined, limited distance h from the grid 11. It should be stressed that the dimensions of the meshes of the grid 11 are such as to prevent the grinding bodies 16 passing through them. A further grid is located across the inlet aperture 12 and prevents the grinding bodies 16 leaving the grinding chamber 4 under gravity.

The mill 1 includes a shaft 18 with opposite ends ($18_a$ and $18_b$) rotatably supported by the casing 2 and including an axial through bore.

Adjacent its end $18_a$, the shaft 18 has a first portion $L_1$ extending coaxially within the grinding chamber 4 and, adjacent its end $18_b$, it has a second portion $L_2$ projecting from the upper face of the casing 2 and connected kinematically to the rotor of an electric motor 22.

Means for stirring the grinding bodies 16, including a plurality of mixer arms 20 and a bottom scraper 21, are attached to the portion $L_1$ of the shaft 18 and are fixed for rotation with it.

The mixer arms 20 project from the shaft 18 and are disposed around it in a helical configuration.

The bottom scraper 21 is fixed to the end $18_a$ of the shaft 18 and constitutes a plug for the cavity formed in the shaft 18 by the axial through bore.

A tube 23 is inserted concentrically in the axial bore of the shaft 18 from the end $18_b$ towards the opposite end $18_a$ but without coming to bear against the bottom scraper 21. Radial spacers, known per se and not shown in the drawings, center the tube 23 radially in the axial bore of the shaft 18 so as to form an annular passage 24 (FIG. 3) between the outer surface of the tube and the inner surface of the shaft 18, this annular passage being in fluid communication with the interior of the tube 23 at the end $18_a$ of the shaft 18. At the end $18_b$ of the shaft 18, the annular passage 24 and the tube 23 are in fluid communication with a delivery duct and a return duct respectively of a second controlled-temperature water circuit not shown in the drawings.

To advantage the outer surface of the portion $L_1$ of the shaft 18 is helically shaped with a right-handed helical thread 19, preferably of two-start type.

Figures 2, 3:
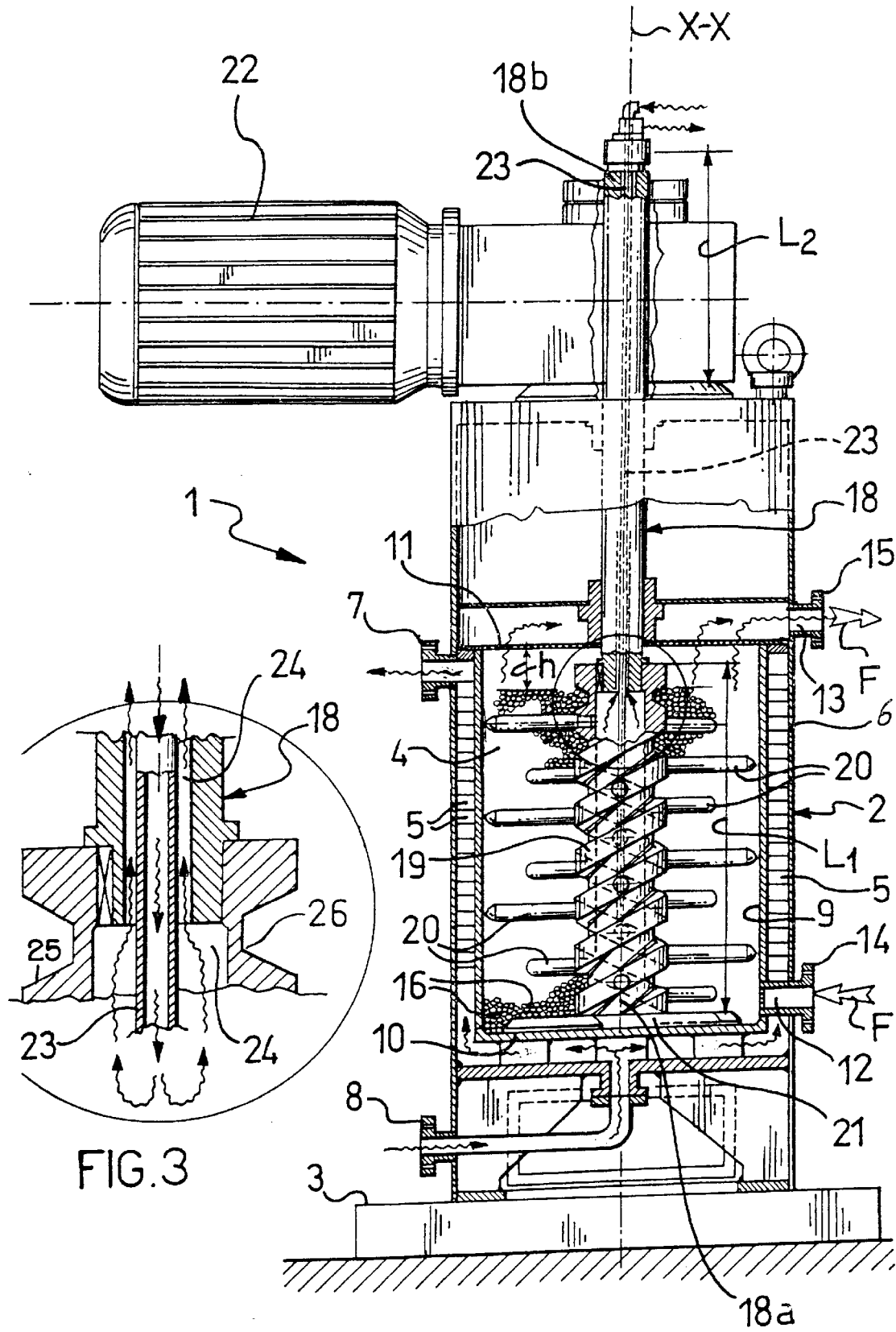
FIG. 2 is a front sectional view of the mill of FIG. 1.
FIG. 3 is a sectional view of a detail of FIG. 1.

Which particular reference with the FIG. 3 and for the reasons which will become more apparent in the following description, the helical thread 19 has a trapezoid longitudinal profile having external 25 and internal 26 sharp corners. Indicatively the radius of the external 25 and internal 26 sharp corners are smaller than 1.2 millimeter, preferably 0.5 millimiters. Alternatively the helical thread 19 can have a square or rectangular longitudinal profile having sharp corners.

With reference to the appended drawings, the mill 1 of the present invention operates as described below with reference to an initial condition in which water is circulated at a controlled temperature within the interspace 5 and within the shaft 18 so as to remove heat generated in the grinding chamber 4 during grinding.

The motor 22 rotates the shaft 18 clockwise and this in turn rotates the plurality of mixer arms 20 and the bottom scraper 21 attached thereto.

The mixer arms 20 act on the grinding bodies 16 to transmit thereto a component of movement which is substantially circumferential and concentric with the shaft 18 and causes the grinding bodies 16 to be stirred continuously while the bottom scraper 21 prevents the mixture and the grinding bodies 16 from stagnating close to the bottom 10 of the grinding chamber 4.

The clockwise rotation of the shaft 18 causes the right-handed helical thread 19 to exert a screw-action on the grinding bodies 16 which forces the grinding bodies 16 adjacent the shaft 18 to rise along the thread 19 towards the grid 11 and consequently forces the grinding bodies 16 which are outermost relative to the shaft 18 to descend towards the bottom 10 of the grinding chamber 4. It should be stressed that the upward movement of the grinding bodies 16 along the shaft 18 is facilitated by the aforesaid profile of the helical thread 19. The grinding bodies 16 are thus made to circulate continuously in a movement which is superimposed on the mixing movement and enables the temperature within the grinding chamber 4, and thus the grinding action, to be made uniform.

A flow F of mixture is delivered by a pump into the grinding chamber 4 through the inlet aperture 12 and there the solid particles are ground by the grinding bodies 16 while flowing towards the outlet aperture 13.

As may be appreciated from what has been described above, one of the advantages of the mill of the present invention for grinding solid particles in general lies in the fact that it enables the temperature reached by the product to be ground in the grinding chamber to be controlled better than in prior art mills. In fact, the continuous circulation, both circumferential and parallel relative to the axis of the shaft, to which the grinding bodies are subject in the grinding chamber enables the temperature to be made uniform at every point, avoiding the undesirable temperature gradients referred to in the prior art from being formed.

A further advantage of the mill of the present invention lies in the fact that the helical surface of the shaft has a greater heat-exchange surface than that of prior art shafts, with a consequent increase in the quantity of heat which it is possible to remove from the grinding chamber.

Furthermore, the mill of the present invention is structurally and functionally simple.

Obviously, an expert in the art could make numerous modifications and variations to the mill described above to satisfy specific, contingent requirements without thereby departing from the protective scope of the invention as defined in the following claims.

Thus, for example, the mill used may differ from that described above in that it may be of a discontinuously operating type in which the grinding chamber is loaded with a quantity of mixture which is discharged only after its solid particle shave been ground to the desired extent, this being possible when a single aperture is used for the loading of the mixture into the grinding chamber and its removal therefrom.

Furthermore, the helical threading with two starts may be replaced by helical threading with a different number of starts or may be replaced by portions with helical profiles which are able to give the grinding bodies an equivalent circulating movement.

What is claimed is:

1. A mill for grinding solid particles in general and, in particular, solid particles dispersed in a continuous lipid phase, comprising:

a casing defining an internal grinding chamber having at least one inlet/outlet aperture for the particles, grinding bodies in the grinding chamber, a motor-driven, rotatable shaft extending through the grinding chamber, and stirrer means fixed for rotation with the motor-driven, rotatable shaft along a longitudinal portion thereof, for stirring the grinding bodies, the motor-driven rotatable shaft having along said longitudinal portion a substantially helical outer surface for transmitting to the grinding bodies a component of movement parallel to the longitudinal axis of the motor-driven, rotatable shaft.

2. A mill according to claim 1, wherein the outer surface of the motor-driven, rotatable shaft has a helical thread of predetermined pitch.

3. A mill according to claim 2, wherein the helical thread has at least two starts.

4. A mill according to claim 2, wherein the helical thread has a profile having sharp corners.

5. A mill according to claim 2, wherein the helical thread has a trapezoid longitudinal profile having external sharp corners.

6. A mill according to claim 2, wherein the helical thread has a trapezoid longitudinal profile having internal sharp corners.

7. A mill according to claim 2, wherein the helical thread has a trapezoid longitudinal profile having internal and external sharp corners.

8. A mill according to claim 2, wherein the helical thread has a square longitudinal profile having external sharp corners.

9. A mill according to claim 2, wherein the helical thread has a square longitudinal profile having internal sharp corners.

10. A mill according to claim 2, wherein the helical thread has a square longitudinal profile having internal and external sharp corners.

11. A mill according to claim 1, wherein the motor-driven, rotatable shaft is hollow to allow the passage of a cooling fluid.

12. A mill according to claim 11, wherein the motor-driven, rotatable shaft houses a coaxial tube within it, an annular passage being defined between the inner surface of the motor-driven, rotatable shaft and the tube.

13. A mill according to claim 1, wherein the casing includes an interspace around its outer wall for the passage of a cooling fluid.

14. A mill according to claim 1, wherein the stirrer means comprise a plurality of mixers arms projecting from the motor-driven, rotatable shaft.

15. A mill according to claim 14, wherein said plurality of mixer arms is disposed around the motor-driven, rotatable shaft in a helical configuration.

16. A mill according to claim 1, wherein the casing is cylindrical with its axis vertical.

17. A mill according to claim 16, wherein the stirrer means include a bottom scraper coaxial with the motor-driven, rotatable shaft and located close to the bottom of the grinding chamber.

* * * * *